May 10, 1966  D. W. KELBEL  3,250,354
SYNCHRONIZER ASSEMBLY
Filed Nov. 27, 1963  2 Sheets-Sheet 1
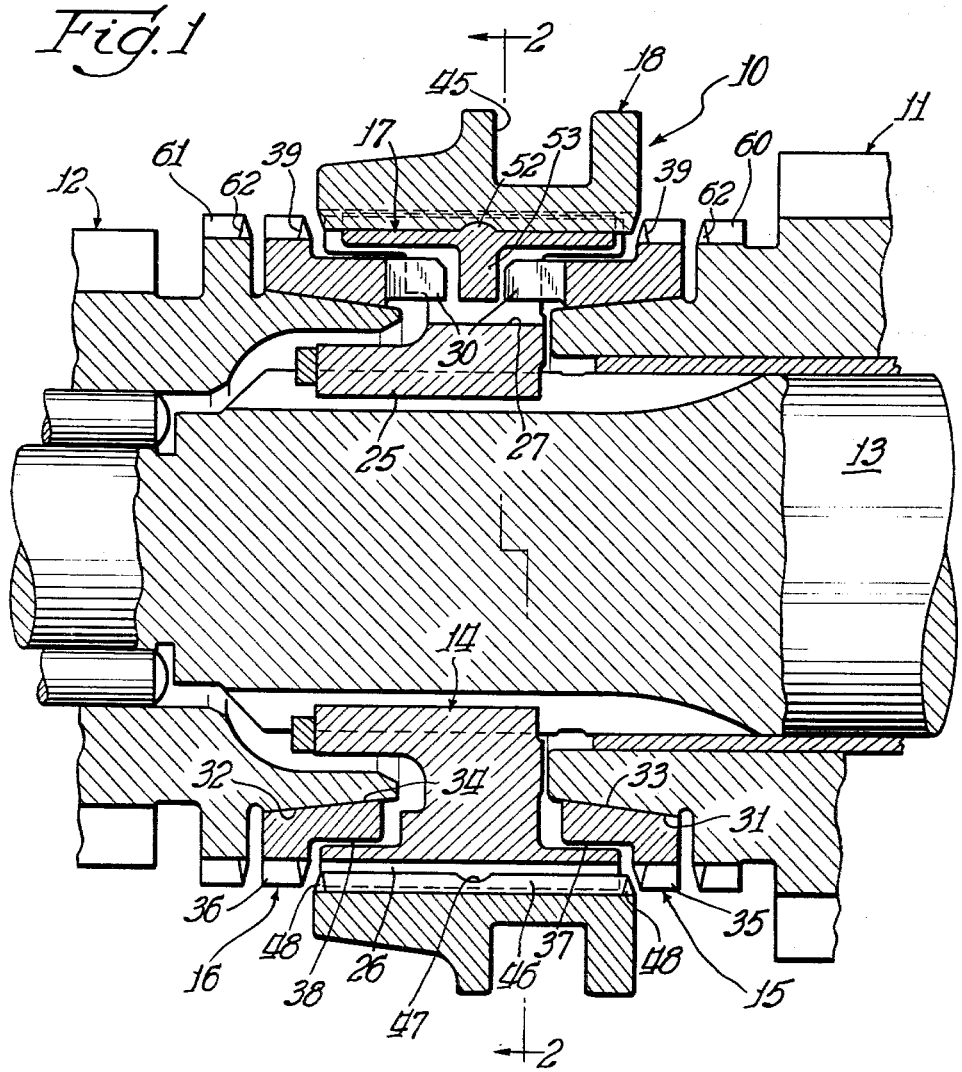
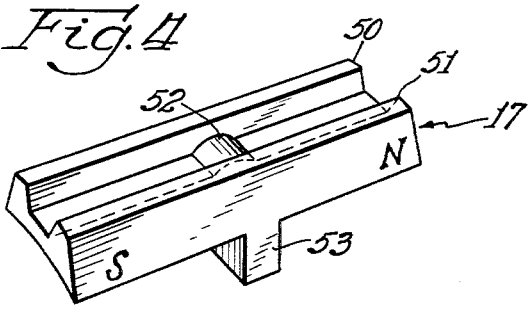
Inventor:
Donald W. Kelbel
By: Robert L. Zieg
Atty May 10, 1966 D. W. KELBEL 3,250,354
SYNCHRONIZER ASSEMBLY
Filed Nov. 27, 1963 2 Sheets-Sheet 2
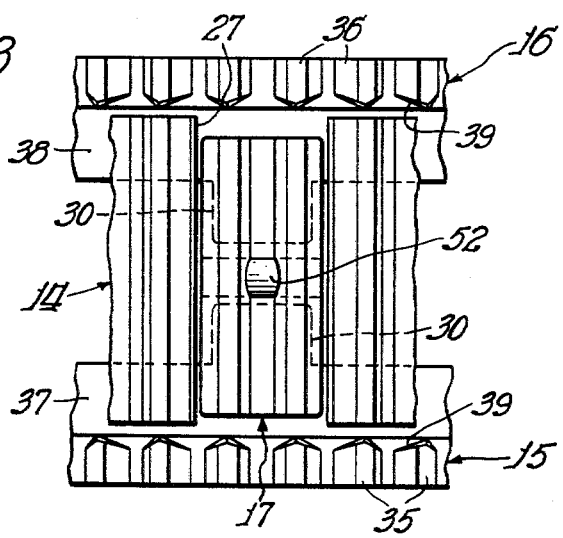
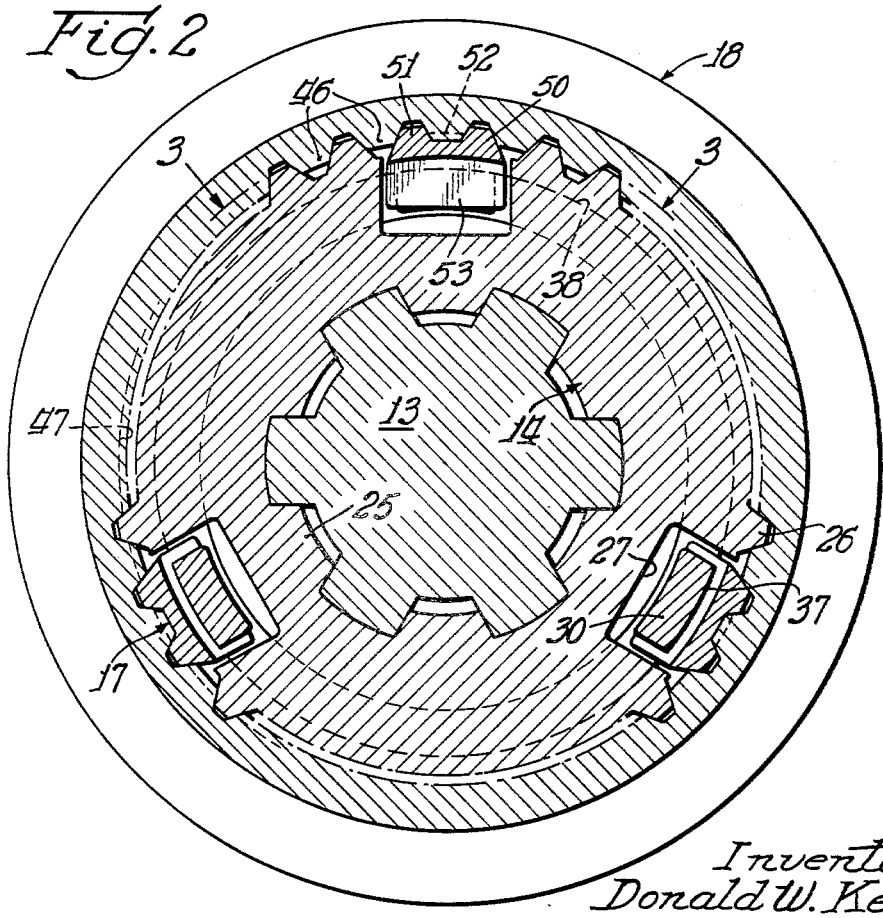
Inventor:
Donald W. Kelbel
By: Robert L. Zieg Atty.

3,250,354
SYNCHRONIZER ASSEMBLY
Donald W. Kelbel, Muncie, Ind., assignor to Borg-Warner Corporation, Chicago, Ill., a corporation of Illinois
Filed Nov. 27, 1963, Ser. No. 326,513
6 Claims. (Cl. 192—53)

This invention relates to a synchronizing device wherein a pair of torque transmitting members are adapted to be drivingly connected by an axially movable clutch sleeve, wherein the shifting movement of the clutch sleeve toward clutching position is blocked by a blocking element or ring until the members are rotating synchronously.

The object of this invention is to provide an improved synchronizer of the type utilizing thrust bars to apply a thrust to the blocking rings wherein the springs normally used in this type of synchronizer to urge the thrust bars into engagement with the clutch sleeve to provide a yieldable connection between the thrust bars and the sleeve have been eliminated through the use of magnetic force to urge the thrust bars into engagement with the clutch sleeve.

The invention consists of the novel constructions, arrangements and devices to be hereinafter described and claimed for carrying out the above-stated objects and such other objects as will be apparent from the following description of the preferred form of the invention illustrated with reference to the accompanying drawings, wherein:

FIG. 1 is an axial sectional view through a transmission synchronizer embodying the invention;

FIG. 2 is a sectional view taken as indicated by the line 2—2 of FIG. 1;

FIG. 3 is a chordal sectional view taken along the line 3—3 of FIG. 2; and

FIG. 4 is a perspective view of the thrust elements illustrated in FIGS. 1, 2 and 3.

The present invention comprises an improvement over known types of synchronizer structures utilizing thrust bars such for example as disclosed in Patent 2,221,900 to White et al., as will be pointed out.

Referring to FIG. 1, the synchronizing assembly 10 is illustrated as used in a transmission providing synchronization when engaging either of the rotatable parts or gears 11 or 12 of different ratio.

The mechanism, as illustrated in FIG. 1, includes the gears 11 and 12 which are to be selectively drivingly connected to the shaft 13 for transfer of torque between the shaft and the selected gear. The synchronizing mechanism includes a hub or torque transmitting member 14 drivingly connected to the shaft, blocker rings or synchronizer members 15 and 16 drivingly connected to the torque transmitting member and engageable with gears 11 and 12 respectively, thrust bars or elements 17 mounted within the torque transmitting members, and an axially shiftable clutch sleeve element 18 surrounding and drivingly connected to the torque transmitting member 14 and in engagement with the thrust bars 17.

The torque transmitting member 14 is drivingly connected to the shaft 13 by splines 25 and has splines 26 connecting the torque transmitting member to the clutch sleeve 18. Axial slots 27 are formed in the torque transmitting member 14 on the outer diameter thereof, as illustrated in FIG. 2, in which the thrust bars 17 and a portion of the synchronizing members 15 and 16 are received.

The synchronizing members or blocking rings 15 and 16 have axially projecting lugs 30 thereon received by the slots 27 in the torque transmitting member 14. Conical friction clutch surfaces 31 and 32 are formed on the synchronizing members 15 and 16 respectively, which engage with matching friction clutch surfaces 33 and 34 on the gears 11 and 12 respectively. The synchronizing members 15 and 16 have also radially projecting external clutch teeth 35 and 36 and external annular surfaces 37 and 38 respectively. The external clutch teeth 35 and 36 are chamfered as indicated at 39.

The axially shiftable clutch sleeve element 18 has a circumferential groove 45 formed in the annular outer surface adapted to be engaged by a shifting fork of the transmission. The sleeve also has internal teeth 46 formed therein engageable with the teeth 26 on the torque transmitting member, and a circumferential groove 47 formed in the teeth 46 on the inner diameter of the sleeve. The teeth 46 are chamfered as indicated at 48.

The thrust elements or bars 17 as illustrated in FIG. 4 have two longitudinal raised splines or teeth 50 and 51 formed thereon engageable with the complementary splines or teeth 46 formed in the clutch sleeve 18, and a protuberance or projection 52 formed thereon engageable in the circumferential groove 47 formed in the clutch sleeve 18. The thrust bars 17 have a thrust transmitting portion 53 extending therefrom on the lower side, as viewed in FIG. 4.

As illustrated in FIG. 3, the thrust bars 17 are mounted within the axial slots 27 in the torque transmitting member 14 just above the lugs 30 on the synchronizing elements 15 and 16.

External clutch teeth 60 and 61 are formed on the gears 11 and 12 respectively and are chamfered as indicated at 62.

In a synchronizer of the type described, a means is required to urge the thrust bars 17 radially outwardly into engagement with the clutch sleeve 18 to establish a yieldable thrust transmitting relation between the thrust elements and the sleeve 18. In the heretofore known types of synchronizers using thrust bars, a spring means is provided to urge the thrust bars radially outwardly to cause a releasable poppet-like action, such for example as disclosed in Patent 2,221,900 to White et al.

The unique improvement herein disclosed and claimed broadly comprises the employment of at least one element incorporating the properties of a permanent magnet whereby the thrust bars are attracted in the direction of engagement with the sleeve element by the action of the magnetic force. More specifically in the herein-disclosed preferred embodiment which results in unusually satisfactory operation, it has been discovered that the thrust bar itself can be made to advantage by casting the thrust bar from commercially available material having superior magnetic property retention characteristics and then magnetizing the thrust bar. The thrust bar can be accurately made by casting so as to eliminate the necessity of any machining operations.

The operation of the synchronizer assembly of the present invention is as follows: when one of the gears is to be engaged, for example gear 11, the clutch sleeve 18 is moved to the right, as shown in FIG. 1, by the shifting fork (not illustrated).

When the clutch sleeve 18 is moved to the right to engage the gear 11 the thrust bars 17 will be moved axially due to the engagement of the projections 52 with the circumferential groove 47 providing an axial thrust transmitting relationship between the thrust bars and the clutch sleeve. The thrust bars 17 will be moved to the right and the thrust transmitting portion 53 will bear against the lugs 30 on the synchronizing member or blocking ring 15 and urge the blocking ring to the right until the inner conical surface 31 of the blocking ring engages the conical surface 33 of the gear 11. This initial engagement will cause the synchronizing member to turn with the gear 11 and thus tends to cause a relative rotation between the blocking ring 15 and the torque transmitting member 14 in the direction of movement of the part which is rotating at a greater speed.

Limited relative movement between the torque transmitting member 14 and the synchronizing member 15 is possible since the axial slots 27 in the torque transmitting member are slightly wider than the lugs 30 on the synchronizing members. Due to the relative rotation the chamfered surfaces at 39 on the teeth 35 of the blocking ring and the chamfered surfaces at 48 on the teeth 46 of the clutch sleeve will be in blocking register.

Continued movement of the clutch sleeve will therefore be resisted by the chamfered surfaces of the teeth even though considerable force is applied to the clutch sleeve tending to move it into engagement with the teeth 60 on the gear 11 to provide a positive driving connection. This resistance to positive clutch engagement will exist until the gear 11 arrives at a speed synchronous with the speed of the clutch sleeve 18, at which time there will be a relative reversal of movement causing the synchronizing member or blocking ring 15 to move to a position where the teeth 35 are in register with the teeth 46 on the clutch sleeve.

When such a position is assumed, there will be no further resistance to movement of the clutch sleeve to the right, and it may therefore be moved into positive clutch engagement with the teeth 60 on the gear 11. The yielding connection between the thrust bars or elements 17 and the clutch sleeve 18 breaks away under the force applied to move the clutch sleeve to the right. In other words, the magnetic force is overcome and the thrust bars 17 move radially inwardly as the projections 52 move out of the circumferential groove 47 as the sleeve is moved to the right. Thus, a positive driving connection is now provided between the clutch sleeve and the gear.

The operation of the synchronizing mechanism when engaging the gear 12 is identical to that described above for engaging the gear 11.

The inventive and novel feature of the invention, as mentioned above, is the fact that the thrust bars 17 are urged into engagement with the clutch sleeve 18 by magnetic force. This magnetic force may be obtained by incorporating magnetic properties in the thrust bars 17 or the clutch sleeve 18. Thus, the invention has two embodiments which, even though they cannot be separately illustrated, can be made by using a magnetized sleeve element or by using magnetized thrust bars.

From the above it will be apparent that the improved synchronizer construction of the present invention is greatly simplified, resulting in a more economical construction than the prior art devices. Since magnetic force is used to urge the thrust bars radially outwardly, the conventional springs utilized for this purpose are eliminated. Further economy results in that the assembly of the synchronizing mechanism within a transmission is greatly simplified since the thrust bars will hold themselves in position during the assembly operation without the aid of a spring or other means to do so.

While I have described my invention in connection with certain specific embodiments thereof, it is to be understood that this is by way of illustration and not by way of limitation and the scope of my invention is defined solely by the appended claims, which should be construed as broadly as the prior art will permit.

What is claimed is:

1. In a synchronizer mechanism a torque transmitting member; a rotatable part adjacent said torque transmitting member to be synchronized therewith; a synchronizer member drivingly connected to said torque transmitting member and shiftable axially to establish a friction driving connection between said torque transmitting member and said rotatable part; a sleeve element encircling said torque transmitting member and drivingly connected thereto, said sleeve element being shiftable axially to establish a positive driving connection between said torque transmitting member and said rotatable part; means including at least one shiftable thrust element interposed between said sleeve element and said torque transmitting member, said arrangement being particularly characterized by at least one of said elements having magnetic properties incorporated therein to thus urge said elements into engagement to yieldingly establish axial thrust transmitting association therebetween.

2. In a synchronizer mechanism a torque transmitting member having an annular outer surface; a rotatable part adjacent said torque transmitting member to be synchronized therewith; a synchronizer member drivingly connected to said torque transmitting member and shiftable axially to establish a friction driving connection between said torque transmitting member and said rotatable part; a sleeve element encircling said torque transmitting member and drivingly connected thereto, said sleeve element being shiftable axially to establish a positive driving connection between said torque transmitting member and said rotatable part, said torque transmitting member being provided with at least one slot extending axially along the annular outer surface thereof; a thrust element disposed in said slot and having axial thrust transmitting association with said sleeve element and said synchronizer member, one of said elements being magnetized to urge said thrust element radially outwardly into engagement with said sleeve element to yieldingly establish said thrust transmitting association.

3. In a synchronizer mechanism a torque transmitting member; a rotatable part adjacent said torque transmitting member to be synchronized therewith, a synchronizer member drivingly connected to said torque transmitting member and shiftable axially to establish a frictional driving connection between said torque transmitting member and said rotatable part; a sleeve element encircling said torque transmitting member and drivingly connected thereto, said sleeve being shiftable axially to establish a positive driving connection between said torque transmitting member and said rotatable part; a plurality of thrust elements interposed between said sleeve element and said torque transmitting member and having axial thrust transmitting association with said sleeve element and said synchronizer member, said sleeve element being magnetized to urge said thrust elements radially outwardly into engagement with said sleeve element to yieldingly establish said thrust transmitting association.

4. In a synchronizer mechanism a torque transmitting member; a rotatable part adjacent said torque transmitting member to be synchronized therewith; a synchronizer member drivingly connected to said torque transmitting member and shiftable axially to establish a frictional driving connection between said torque transmitting member and said rotatable part; a sleeve element encircling said torque transmitting member and drivingly connected thereto, said sleeve being shiftable axially to establish a positive driving connection between said torque transmitting member and said rotatable part; a plurality of thrust elements interposed between said sleeve element and said torque transmitting member and having axial thrust transmitting association with said sleeve and said sleeve element, said thrust elements being magnetized whereby said thrust elements are urged radially outwardly into engagement with said sleeve element to yieldingly establish said thrust transmitting association.

5. In a synchronizer mechanism including a shaft; a rotatable part with clutch teeth thereon rotatably mounted on said shaft; a hub with clutch teeth on its outer periphery; and slots radially spaced around said periphery mounted on and fixed for rotation with said shaft; a sleeve element slidably mounted on said hub having a first position in which said hub and said rotatable part are not connected, and a second position in which said sleeve engages the teeth on said rotatable part to drivingly connect said hub and said rotatable part; friction means interposed between said hub and said rotatable part; and a plurality of magnetic thrust elements mounted in said slots, said thrust elements being magnetically attracted to said sliding sleeve element so that, when said sleeve element is moved from its first position to its second position, the thrust elements force the friction means to stop relative rotation between the hub member and the rotatable part prior to engagement of the sleeve element with the clutch teeth on the rotatable part.

6. In a synchonizer mechanism for bringing two coaxially disposed relatively rotatable members into synchonism comprising means defining a first rotatable member; means defining a second rotatable member coaxially disposed with reference to said first rotatable member; selectively shiftable synchronizing means including a friction clutch effective to bring said first and said second rotatable members into synchronization, said last named means including a sleeve element embracing said first member in axially slidable non-relatively rotatable relation, said sleeve element being shiftable axially to establish a positive driving connection between said relatively rotatable members; at least one axially shiftable thrust element engageable by said sleeve and shiftable thereby to cause engagement of said friction clutch, said arrangement being particularly characterized by the incorporation of magnetic properties in at least one of said last-named elements, whereby said elements are magnetically attracted to each other with the result that, when said sleeve is shifted axially, said thrust element is moved into engagement with said friction clutch and said relatively rotatable members are brought into synchronism.

References Cited by the Examiner
UNITED STATES PATENTS

| | | | |
|---|---|---|---|
| 2,495,411 | 1/1950 | Frost | 192—53.6 |
| 2,665,788 | 1/1954 | Hughes | 192—53.6 X |
| 2,876,878 | 3/1959 | Sinclair et al. | 192—53.4 X |

DON A. WAITE, *Primary Examiner.*

A. T. McKEON, *Assistant Examiner.*